US012631574B2

(12) United States Patent
Matsubara

(10) Patent No.: US 12,631,574 B2
(45) Date of Patent: May 19, 2026

(54) X-RAY TRANSMISSION INSPECTION APPARATUS AND X-RAY TRANSMISSION INSPECTION METHOD

(71) Applicant: HITACHI HIGH-TECH ANALYSIS CORPORATION, Tokyo (JP)

(72) Inventor: Satoshi Matsubara, Tokyo (JP)

(73) Assignee: HITACHI HIGH-TECH ANALYSIS CORPORATION, Tokyo (JP)

( * ) Notice: Subject to any disclaimer, the term of this patent is extended or adjusted under 35 U.S.C. 154(b) by 106 days.

(21) Appl. No.: 18/407,190

(22) Filed: Jan. 8, 2024

(65) Prior Publication Data

US 2024/0255443 A1 Aug. 1, 2024

(51) Int. Cl.
*G01N 23/083* (2018.01)
(52) U.S. Cl.
CPC ..... *G01N 23/083* (2013.01); *G01N 2223/304* (2013.01)
(58) Field of Classification Search
CPC .............................. G01N 23/04; G01N 23/083
See application file for complete search history.

(56) References Cited

U.S. PATENT DOCUMENTS 8,228,488 B2 * 7/2012 Schmitt ................ G01B 11/245
378/54
9,863,897 B2 * 1/2018 Sugimoto ............ G01N 23/083

11,320,562 B2 * 5/2022 Parmee .................. G01N 23/04
2019/0025231 A1 * 1/2019 Jakubek ................. G01N 23/04
2023/0314346 A1 * 10/2023 Olesen ................... G01N 23/18
378/51

FOREIGN PATENT DOCUMENTS

JP H05-34131 2/1993
JP 5813923 11/2015

* cited by examiner

*Primary Examiner* — David J Makiya
(74) *Attorney, Agent, or Firm* — Holland & Hart LLP

(57) ABSTRACT

Proposed are an X-ray transmission inspection apparatus and an X-ray transmission inspection method, in which transmission images with a large difference between irradiation angles are obtained so that the depth of the position of a foreign object can be obtained with high precision. The apparatus includes an X-ray source, an X-ray sensor configured to detect a transmitted X-ray, a sample moving mechanism configured to move the sample in a specific transport direction, and a calculation part configured to calculate a height position of a foreign object in a thickness direction in the sample on the basis of the transmitted X-ray detected by the X-ray sensor, wherein the X-ray source and the X-ray sensor include X-ray sources and X-ray sensors, the X-ray sources irradiate the sample with x-rays, and the X-ray sensors are disposed to respectively detect only transmitted X-rays of X-rays from the corresponding X-ray sources.

10 Claims, 6 Drawing Sheets

X-RAY TRANSMISSION INSPECTION APPARATUS AND X-RAY TRANSMISSION INSPECTION METHOD

CROSS REFERENCE TO RELATED APPLICATION

The present application claims priority to Japan Patent Application No. 2023-13183, filed Jan. 31, 2023, the entire contents of which are incorporated herein for all purposes by this reference.

BACKGROUND OF THE INVENTION

Field of the Invention

The present disclosure relates to an X-ray transmission inspection apparatus and an X-ray transmission inspection method, in which a metal foreign object in a sample can be detected.

Description of the Related Art

A lithium-ion secondary battery, which has a higher energy density than a nickel-metal hydride battery, is a type of non-aqueous electrolyte secondary battery in which lithium ions in an electrolyte are responsible for electrical conduction and metallic lithium is not included. The lithium-ion secondary battery is used as a battery for vehicles, hybrid vehicles and electric vehicles, as well as personal computers and mobile phones.

Generally, X-ray transmission inspection performed by an X-ray transmission image obtained by irradiating a sample with X-rays to detect a metal foreign object in the sample is used. For example, the X-ray transmission inspection is used to inspect a foreign object in a material of the lithium ion secondary battery.

For example, as described in a conventional technology disclosed in Patent Document 1, a foreign object detection method in which the presence or absence of a foreign object is detected by a transmitted X-ray image has been proposed.

In addition, as described in Patent Document 2, an image processing device is known in which a plurality of X-ray sensors is used to obtain a plurality of images from X-rays passing through a sample, and the amount of misalignment of the plurality of images is used so that a distance between an X-ray source and the inspection object of the sample, that is, depth information can be obtained.

DOCUMENTS OF RELATED ART (Patent Document 1) Japan Patent No. 5813923
(Patent Document 2) Japanese patent application publication No. Hei Sei 5-034131

SUMMARY OF THE INVENTION

The related art described above has the problem described below.

In a conventional device described in Patent Document 2, although a plurality of X-ray sensors is used, a distance between the X-ray sensors is small, and change in an irradiation angle is small, and thus the amount of misalignment of a foreign object in a sample between transmission images decreases, so there is a problem that the estimation precision of the depth of the position of the foreign object is low.

The present disclosure is made in consideration of the above-mentioned problem, and is intended to provide an X-ray transmission inspection apparatus and an X-ray transmission inspection method, in which transmission images with a large difference between irradiation angles are obtained so that the depth of the position of a foreign object can be obtained with high precision.

The present disclosure employs the following configurations to solve the above problems. That is, the X-ray transmission inspection apparatus according to a first invention includes: an X-ray source configured to irradiate a sample with an X-ray: an X-ray sensor installed on a side opposite to the X-ray source relative to the sample and configured to detect transmitted X-rays when the X-rays passe through the sample: a sample moving mechanism configured to move the sample in a specific transport direction; and a calculation part configured to calculate a height position of a foreign object in a thickness direction in the sample based on the transmitted X-rays detected by the X-ray sensor, wherein a plurality of sets of the X-ray sources paired with the X-ray sensors in one-to-one correspondence are provided, each X-ray source of the plurality of sets of the X-ray sources paired with the X-ray sensors in one-to-one correspondence irradiates the sample with X-rays at a different irradiation angle with respect to the thickness direction of the sample, and each X-ray sensor of the plurality of sets of the X-ray sources paired with the X-ray sensors in one-to-one correspondence is arranged to detect only the transmitted X-rays of X-rays from a corresponding X-ray source.

In the X-ray transmission inspection apparatus, each X-ray source of the plurality of sets of the X-ray sources paired with the X-ray sensors in one-to-one correspondence may irradiates the sample with X-rays at different irradiation angle, the X-ray sensors of the plurality of sets of the X-ray sources paired with the X-ray sensors in one-to-one correspondence may be arranged to detect only the transmitted X-rays of X-rays from a corresponding X-ray source, and thus a distance between the X-ray sensors may be preset to be large, so transmission images with a large difference between irradiation angles of the X-rays may be obtained. Accordingly, the amount of misalignment of a foreign object in the sample among a plurality of transmission images caused by a plurality of X-ray irradiations performed at different angles increases at the position of the depth (the height position of a thickness direction) of the foreign object, so the depth of the position of the foreign object may be estimated with high precision.

The X-ray transmission inspection apparatus according to a second invention features that in the first invention, the calculation part may calculate the height position of the foreign object from an amount of misalignment among a plurality of X-ray transmission images detected by the X-ray sensors of the plurality of sets of the X-ray sources paired with the X-ray sensors in one-to-one correspondence.

The X-ray transmission inspection apparatus according to a third invention features that in the first and second invention, the X-ray sensor may be a TDI sensor.

The X-ray transmission inspection apparatus according to a fourth invention features that in the first invention, the X-ray transmission inspection apparatus may further include: a reference piece installed on a surface of the sample, wherein the calculation part may calculate the height position of the foreign object by comparison with a height position of the reference piece.

That is, in the X-ray transmission inspection apparatus, the calculation part may calculate the height position of the foreign object by comparison with the height position of the reference piece. Accordingly, when the reference of a distance between a transmission image and a foreign object is not determined or when the bending of the sample is large, the height position of the foreign object may be compared with the reference piece on the surface of the sample detected, so the depth position (the height position) of the foreign object from the surface of the sample may be obtained.

The X-ray transmission inspection apparatus according to a fifth invention features that in the first or second invention, each X-ray source of the plurality of sets of the X-ray sources paired with the X-ray sensors in one-to-one correspondence may perform irradiation with X-rays in directions in which X-rays intersect one another.

That is, in the X-ray transmission inspection apparatus, the plurality of X-ray sources may perform the irradiation of X-rays in directions in which the X-rays intersect with each other, and thus X-ray irradiation of different irradiation angles from the plurality of X-ray sources may be performed on a small region of the sample. Accordingly, when only a small region is inspected, the distance of the movement of the sample by the sample moving mechanism may be decreased.

The X-ray transmission inspection apparatus according to a sixth invention features that in the first or second invention, each X-ray source of the plurality of sets of the X-ray sources paired with the X-ray sensors in one-to-one correspondence may irradiate regions spaced apart from one another in the transport direction with X-rays That is, in the X-ray transmission inspection apparatus, the plurality of X-ray sources may perform X-ray irradiation on regions spaced apart from one another in the transport direction, and thus the plurality of X-ray sources may be disposed to be spaced by a large distance apart from each other, so without the limitation of the disposition of the X-ray sources, installation freedom thereof may be increased.

There is provided an X-ray transmission inspection method according to a seventh invention using the X-ray transmission inspection apparatus of the first invention, the X-ray transmission inspection apparatus comprising two sets of the X-ray sources paired with the X-ray sensors in one-to-one correspondence, the method including: moving the sample in the transport direction; detecting, as a first passing point a position in the transport direction at which a foreign object in the sample is detected based on transmitted X-rays detected by the X-ray sensor of one of two sets of the X-ray sources paired with the X-ray sensors in one-to-one correspondence; detecting, as a second passing point, a position in the transport direction at which the foreign object in the sample is detected based on transmitted X-rays detected by the X-ray sensor of the other one of two sets of the X-ray sources paired with the X-ray sensors in one-to-one correspondence; and calculating a height position of the foreign object in the sample based on the first passing point, the second passing point, and the irradiation angles of the X-ray sources of two sets of the X-ray sources paired with the X-ray sensors in one-to-one correspondence.

According to the present disclosure, the following effect is obtained.

That is, according to the X-ray transmission inspection apparatus and X-ray transmission inspection method according to the present disclosure, the X-ray sources of the plurality of pairs irradiate the sample with X-rays at different irradiation angles, and the X-ray sensors of the plurality of pairs are disposed to detect only transmitted X-rays of X-rays from the corresponding X-ray sources, and thus transmission images with a large difference between the irradiation angles of the X-rays are obtained, and the amount of misalignment of an foreign object in the sample increases in a position of depth (a height position in a thickness direction) of the foreign object, thereby enabling the estimation of the depth of the position of a foreign object with high precision.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Hereinafter, a first embodiment of the X-ray transmission inspection apparatus and X-ray transmission inspection method according to the present disclosure will be described with reference to FIGS. 1 to 6.

Figure 1:
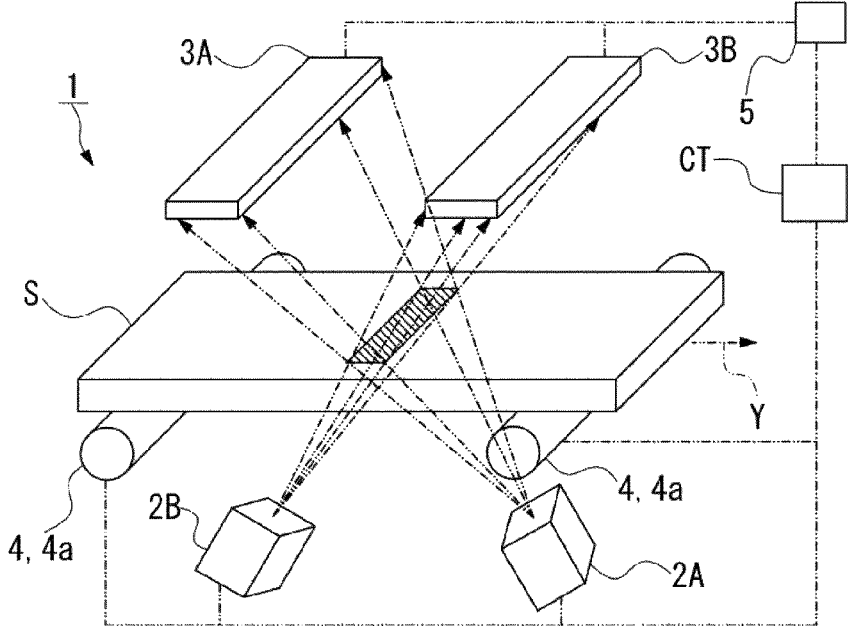
FIG. 1 is a schematic overall configuration view illustrating a first embodiment of an X-ray transmission inspection apparatus and an X-ray transmission inspection method according to the present disclosure.

As illustrated in FIG. 1, the X-ray transmission inspection apparatus 1 of this embodiment includes: an X-ray source 2A or 2B configured to irradiate a sample S with X-rays (a primary X-ray); an X-ray sensor 3A or 3B installed on a side opposite to the X-ray source 2A or 2B relative to the sample S and configured to detect transmitted X-rays when the X-rays passe through the sample S: a sample moving mechanism 4 configured to move the sample S in a transport direction Y (a direction orthogonal to a thickness direction of the sample S); and a calculation part 5 configured to calculate a height position of a foreign object in the thickness direction in the sample S on the basis of the transmitted X-rays detected by the X-ray sensors 3A and 3B.

The calculation part 5 has a function of calculating the height position of the foreign object from the amount of misalignment among a plurality of X-ray transmission images detected by the X-ray sensors 3A and 3B of the plurality of pairs, respectively.

A plurality of sets of the X-ray source 2A or 2B paired with the X-ray sensor 3A or 3B in one-to-one correspondence are installed.

In addition, the X-ray transmission inspection apparatus 1 of this embodiment includes two sets (two pairs) of the X-ray sensor 3A corresponding to the X-ray source 2A and the X-ray sensor 3B corresponding to the X-ray source 2B.

The X-ray sources 2A and 2B of the plurality of pairs irradiate the sample S with X-rays at different irradiation angles with respect to the thickness direction of the sample S. That is, the X-ray source 2A performs X-ray irradiation at an irradiation angle θ1, and the X-ray source 2B performs X-ray irradiation at an irradiation angle θ2.

The X-ray sensors 3A and 3B of the plurality of pairs are disposed to detect only transmitted X-rays of X-rays from the corresponding X-ray sources 2A and 2B.

In this embodiment, the plurality of X-ray sources 2A and 2B is disposed to perform the irradiation of X-rays in directions in which the X-rays intersect with each other in the sample S.

In addition, the X-ray transmission inspection apparatus 1 of this embodiment includes a control device CT that controls the X-ray sources 2A and 2B, the X-ray sensors 3A and 3B, the sample moving mechanism 4, and the calculation part 5.

In addition, in this embodiment, the transport direction of the sample S is Y, the height direction (a depth direction) thereof is Z, and the inspection width direction thereof is X.

For example, the sample S is a strip-shaped material for lithium-ion batteries or a material used in the pharmaceutical industry.

The X-ray source 2A or 2B, which is an X-ray tube capable of performing X-ray irradiation, emits, from a window of beryllium foil, X-rays generated when hot electrons generated from a filament (cathode) in the tube are accelerated by a voltage applied between the filament (cathode) and a target (anode) and collide with tungsten (W), molybdenum (Mo), and chromium (Cr) of the target.

In addition, the X-ray transmission inspection apparatus 1 of this embodiment may include a collimator that limits the spread of X-rays from the X-ray source 2A or 2B, or a polycapillary that converts X-rays into parallel X-rays.

Each of the X-ray sensors 3A and 3B is a line sensor, such as a time delay integration (TDI) sensor, extending in a perpendicular direction (an inspection width direction X) with respect to the transport direction Y in which a sample S moves.

A TDI sensor has a plurality of cells (sensor elements) disposed on a surface facing a corresponding X-ray source, and is provided with a fluorescent body disposed on a detection surface, a fiber optic plate (FOP) in which a plurality of optical fibers are arranged in multiple rows vertically and horizontally in a two-dimensional manner under the fluorescent body, and a Si light-receiving element disposed under the FOP. The TDI sensor has the same configuration as line sensors arranged in multiple rows.

For example, in each of the X-ray sensors 3A and 3B, the TDI sensor is configured by 200 to 1000 unit line sensors lined up in the transport direction of the sample S.

The control device CT is a computer including a CPU which is connected to and controls the X-ray sources 2A and 2B, the X-ray sensors 3A and 3B, the moving mechanism 4, and the calculation part 5.

This control device CT adjusts the direction and speed of charge transfer of each of the X-ray sensors 3A or 3B, which is the TDI sensor, to the moving direction and speed of the sample S, and has the function of integrating the luminance values of X-rays received by the X-ray sensor 3A or 3B in the detection area of a light-receiving surface.

In addition, the control device CT may include the calculation part 5.

The sample moving mechanism 4 is, for example, a motor that can move relative to the X-ray sensor 3A or 3B in a direction in which a sheet-shaped sample S extends. For example, the sample moving mechanism 4 includes at least one pair of rollers 4a configured to move a strip-shaped sample S in an extension direction thereof in a roll-to-roll manner.

The calculation part 5 has a function of obtaining a contrast image from a transmission image representing the distribution of the intensity of detected transmitted X-rays.

Figure 2:
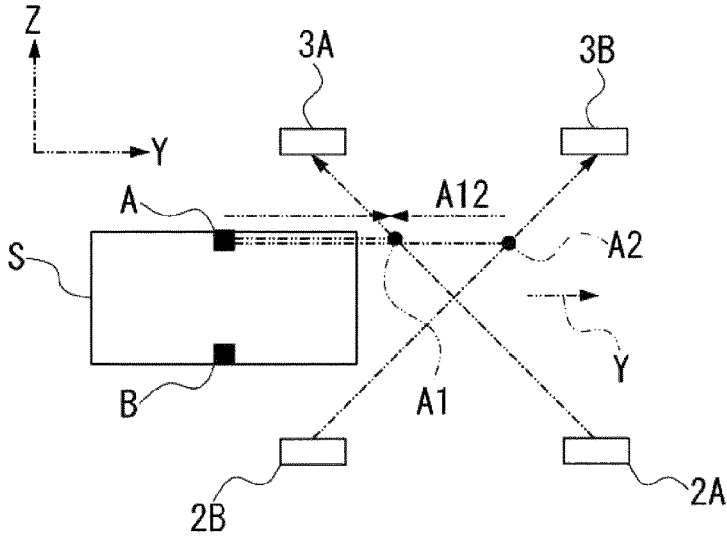
FIG. 2 is a diagram illustrating relative positions of a sample and X-ray sensors at the start of imaging (detection) and passing points when a foreign object on a surface of the sample is detected in the first embodiment.
Figure 3:
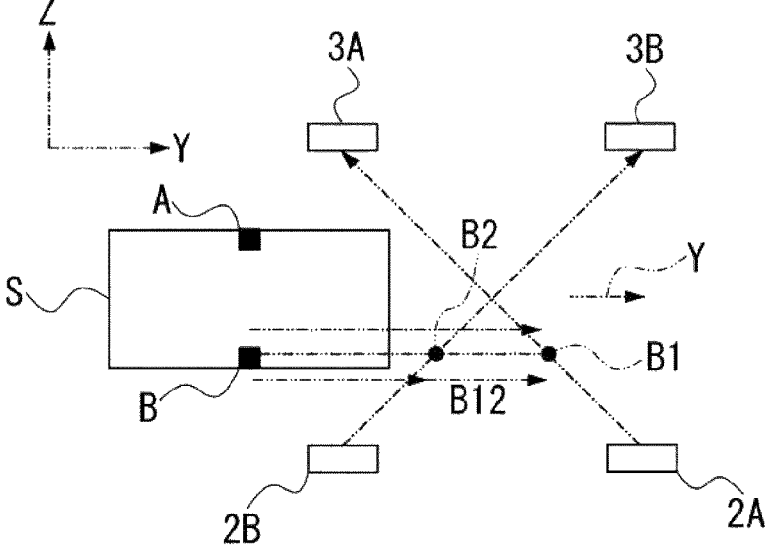
FIG. 3 is a diagram illustrating the relative positions of the sample and the X-ray sensors at the start of imaging (detection) and passing points when a foreign object on another surface of the sample is detected in the first embodiment.
Figure 4:
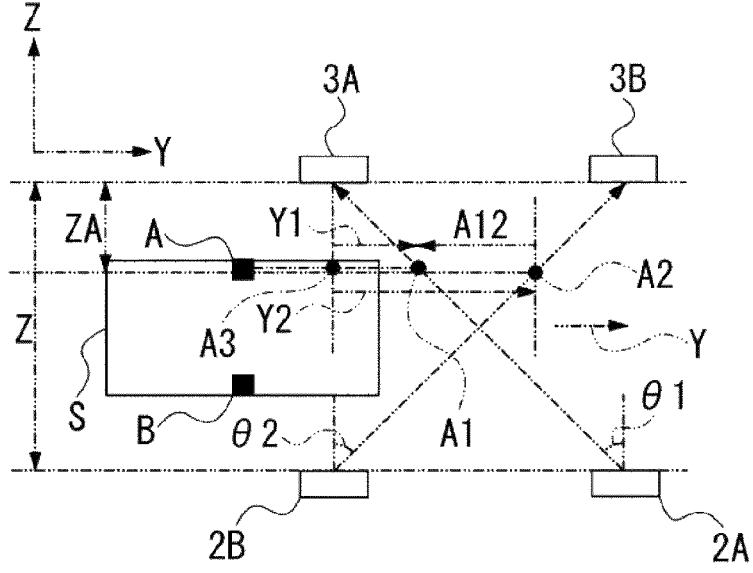
FIG. 4 is a diagram for illustrating a calculation method of obtaining the position of a foreign object of a height direction in the first embodiment.

As illustrated in FIGS. 2 to 4, the X-ray transmission inspection method using the X-ray transmission inspection apparatus 1 of this embodiment includes: moving a sample S in the specific transport direction Y: detecting a position in the specific transport direction Y, in which a foreign object A in the sample S is detected, as a first passing point A1 on the basis of transmitted X-rays detected by the X-ray sensor 3A of the two X-ray sensors 3A and 3B: detecting a position in the transport direction Y at which the foreign object A in the sample S is detected, as a second passing point A2 on the basis of transmitted X-rays detected by another X-ray sensor 3B of the two X-ray sensors 3A and 3B; and calculating a height position of the foreign object A in the sample S on the basis of the first passing point A1, the second passing point A2, and two irradiation angles θ1 and θ2.

Hereinafter, the X-ray transmission inspection method will be described by taking an example of a foreign object A present at a surface side (a side of the X-ray sensor 3A or 3B) of the sample S, and a foreign object B present at another surface side (a side of the X-ray source 2A or 2B) of the sample S.

First, in the moving, when the sample S reaches an imaging start position (a detection start position) of the predetermined transport direction Y, the output of a transmission image starts. In this output transmission image, the beginning of the transport direction Y is taken as the start of imaging (a reference point).

As illustrated in FIG. 2, in the detecting of the first passing point and the detecting of the second passing point, which the sample S moves in the transport direction Y, a position at which the foreign object A passes through the ray axis of the X-ray source 2A and the X-ray sensor 3A is preset as the first passing point A1, and a position at which the foreign object A passes through the ray axis of the X-ray source 2B and the X-ray sensor 3B is preset as the second passing point A2.

In addition, as illustrated in FIG. 3, a position at which the foreign object B passes through the ray axis of the X-ray source 2A and the X-ray sensor 3A is preset as a first passing point B1, and a position at which the foreign object B passes through the ray axis of the X-ray source 2B and the X-ray sensor 3B is preset as a second passing point B2.

When the sample S moves in the transport direction Y, the foreign object A passes through the first passing point A1 and then the second passing point A2, and the foreign object B passes through the second passing point B2 and then the first passing point B1. In addition, a distance between the first passing point A1 and the second passing point A2 is preset as A12, and a distance between the first passing point B1 and the second passing point B2 is preset as B12.

When the imaging of the X-ray sensor 3A and the X-ray sensor 3B is started simultaneously, a difference between times at which the foreign object A passes through the first passing point A1 and the second passing point A2 is represented as a distance A12 of the transport direction Y between the start of imaging and the foreign object A in transmission images. Likewise, a difference between times at which the foreign object B passes through the second passing point B2 and the first passing point B1 is represented as a distance B12 of the transport direction Y between the start of imaging and the foreign object B in transmission images.

The distance of the transport direction Y between the start of imaging and the foreign object A in the transmission images is shorter at the X-ray sensor 3A than at the X-ray sensor 3B, and the distance of the transport direction Y between the start of imaging and the foreign object B is longer at the X-ray sensor 3A than at the X-ray sensor 3B.

Accordingly, according to the height position in the thickness direction of the sample S containing foreign objects A and B put together, timing at which each of the foreign objects A and B passes through the ray axis of an X-ray changes, and thus the height position in the thickness direction of the sample S containing each of the foreign objects A and B put together can be estimated from difference of a distance between a reference point of the transmission image at the start of imaging and the foreign object A or B.

That is, calculation for estimating the height of each of foreign objects A and B put together from difference of a distance between a certain reference point and each of the foreign objects A and B on the basis of the transmission images of the X-ray sensors 3A and 3B in the calculating will be described by using FIG. 4. In addition, this calculation is performed by the calculation part 5.

The imaging start position is a position at which an image output starts on the basis of an arbitrarily set timing so that the inspection region of the sample S is output as a transmission image.

When the foreign object A reaches directly below the X-ray sensor 3A, the position of the foreign object A is set as a reference point A3, and a height (distance) between the reference point A3 and the X-ray sensor 3A is set as ZA.

In addition, a distance between the reference point A3 and the passing point A1 is set as Y1, and a distance between the reference point A3 and the passing point A2 is set as Y2.

In addition, a height (a distance) between the X-ray source 2A and the X-ray sensor 3A perpendicular to the transport direction Y of the sample S and a height (a distance) between the X-ray source 2B and the X-ray sensor 3B perpendicular to the transport direction Y are not required to be the same.

In addition, the X-ray source 2B is not required to be disposed directly below the X-ray sensor 3A.

A distance between an X-ray source and a foreign object may be calculated by the following setting.

An X-ray irradiation angle from the X-ray source 2A to the X-ray sensor 3A: $\theta1$ An X-ray irradiation angle from the X-ray source 2B to the X-ray sensor 3B: $\theta2$ A distance in the height direction from the X-ray source 2A to the X-ray sensor 3A: Z1

A distance in the height direction from the X-ray source 2B to the X-ray sensor 3B: Z2

Here, Z1=Z2=Z.

A distance in the height direction from the X-ray sensor 3A to the foreign object A: ZA1

A distance in the height direction from the X-ray sensor 3B to the foreign object A: ZA2

Here, ZA1=ZA2=ZA.

A distance in the transport direction from the foreign object A to the start of imaging of the X-ray sensor 3A: Y1

A distance in the transport direction from the foreign object A to the start of imaging of the X-ray sensor 3B: Y2

$$Y1 = ZA \cdot \tan\theta1$$
$$Y2 = (Z - ZA)\tan\theta2$$

Accordingly, $$A12 = Y1 - Y2 = (\tan\theta1 + \tan\theta2)ZA - Z \cdot \tan\theta2 \qquad \text{Equation 1}$$

The value of Y1−Y2 increases in proportion to ZA.

Therefore, by obtaining the value of Y1−Y2 from X-ray transmission images, a distance from each of the X-ray sources 2A and 2B to each of the foreign objects A and B can be calculated.

In addition, in the case of |$\theta1$|−|$\theta2$|, as the irradiation angle increases, the estimation precision of the height position is improved.

For example, in a state in which resolution is 10 µm, when |$\theta1$|=|$\theta2$|=45° ($\theta1$=−45°, $\theta2$=45°), the estimation precision of the height position is ±10 µm, and when |$\theta1$|=|$\theta2$|=30° ($\theta1$=−30°, $\theta2$=30°), the estimation precision of the height position is ±17.3 µm.

In addition, in the technology of Patent Document 2, change in an irradiation angle is small, so the estimation precision of a height position is low.

The equation 1 is modified to the following equation, and the estimation accuracy of a height position decreases as an irradiation angle decreases.

$$A12 = Y_1 - Y_2 = (\tan\theta_1 + \tan\theta_2)Z_A - Z \tan\theta_2 \Leftrightarrow Z_A = \frac{Y_1 - Y_2}{\tan\theta_1 + \tan\theta_2} + \frac{Z \tan\theta_2}{\tan\theta_1 + \tan\theta_2} \qquad \text{[Equation 1]}$$

When a precision of each of a distance Y1 and a distance Y2 is ±1 pixel, Y1−Y2 contains an error of up to ±2 pixels.

When resolution is set to 10 µm, the maximum error is ±20 µm.

When the error is included in the equation, the equation becomes the following equation.

$$Z_A = \frac{Y_1 - Y_2}{\tan\theta_1 + \tan\theta_2} + \frac{Z \tan\theta_2}{\tan\theta_1 + \tan\theta_2} \pm \frac{20}{\tan\theta_1 + \tan\theta_2} \qquad \text{[Equation 2]}$$

For example, the error in the case of |$\theta1$|=|$\theta2$|=45° is calculated as follows.

$$\pm \frac{20}{\tan\theta_1 + \tan\theta_2} = \pm \frac{20}{1+1} = \pm 10 \qquad \text{[Equation 3]}$$

For example, the error in the case of $|\theta 1|=|\theta 2|=30°$ is calculated as follows.

$$\pm \frac{20}{\tan\theta_1 + \tan\theta_2} = \pm \frac{20}{0.6 + 0.6} = \pm 16.6 \qquad \text{[Equation 4]}$$

In addition, since in Patent Document 2, an irradiation angle is stated as only a small angle, the assumed angle cannot be known. However, when $|\theta 1|=|\theta 2|=1°$ is assumed and the error of the estimation precision of a height position is calculated under the same condition, the error is $\pm 573$ μm.

Figure 5:
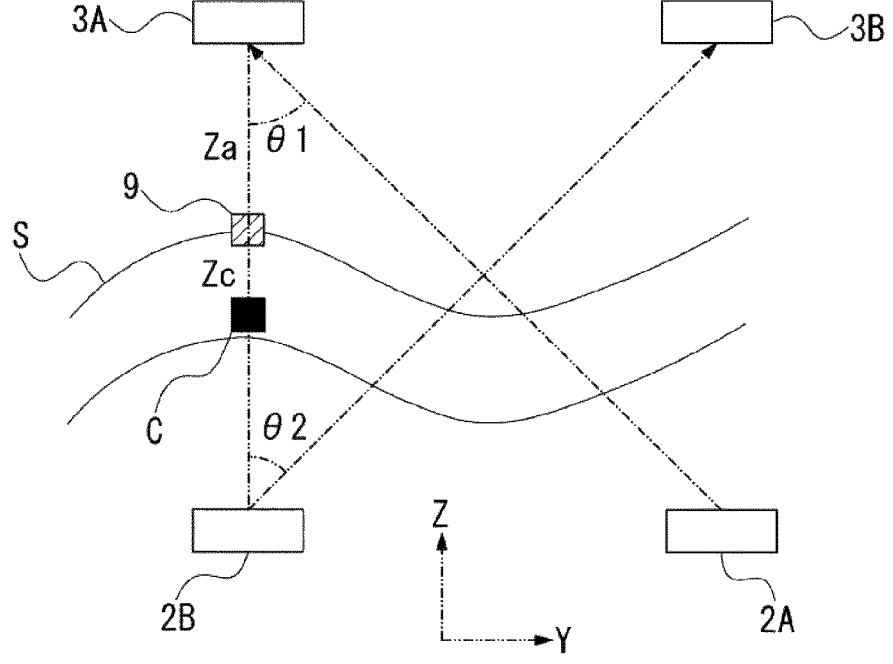
FIG. 5 is a schematic diagram illustrating a reference piece and a height position of a foreign object when the sample is bent in the first embodiment.

Next, when the reference of a distance between a transmission image and a foreign object is not determined or when the bending of the sample S is large, a reference piece 9 is placed on the surface of the sample S as illustrated in FIG. 5, and thus the depth position of the foreign object C from the surface of the sample S can be estimated.

That is, when due to the instability of the imaging start position, the imaging start position cannot be used as a reference of a distance up to a foreign object, when a feature point which is a reference from a transmission image, such as the end of the sample S, cannot be determined, or when a distance between the X-ray sensor 3A or 3B and the surface of the sample S is not constant due to the bending of the sample S, the depth position of the foreign object can be estimated.

In the X-ray transmission inspection apparatus 1 of this embodiment, when the sample S is bent, the reference piece 9 installed on the surface of the sample S is provided as illustrated in FIG. 5, and thus the calculation part 5 can calculate the height position of the foreign object C by comparison with the height position of the reference piece 9.

For example, when a distance between the X-ray sensor 3A and the reference piece 9 (the surface of the sample S) of metal is Za, and a distance between the X-ray sensor 3A and the foreign object C is Zc, a distance between the reference piece 9 (the surface of the sample S) and the foreign object C is Za–Zc.

Figure 6:
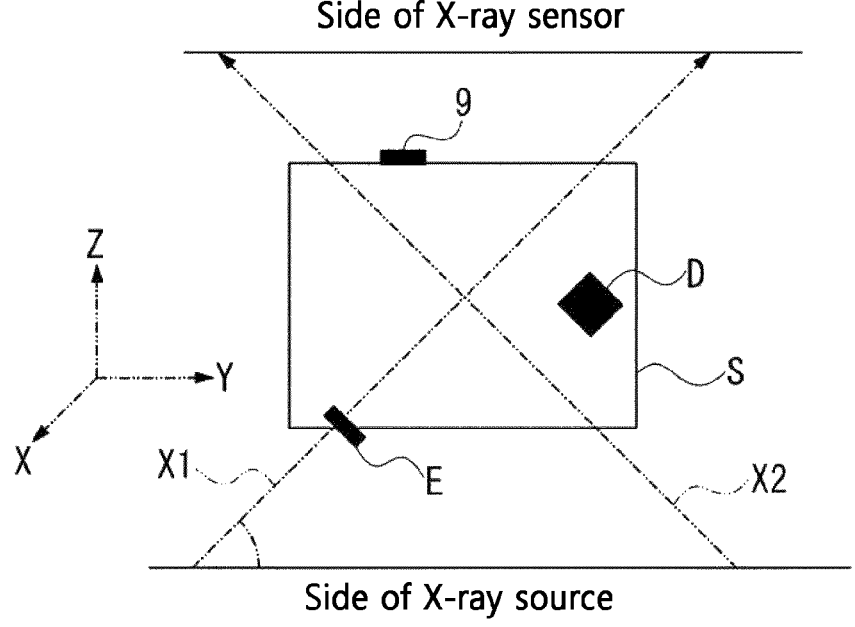
FIG. 6 is a schematic diagram illustrating the height position of a foreign object when the three-dimensional shape of the foreign object is detected in the first embodiment.
Figure 7A:
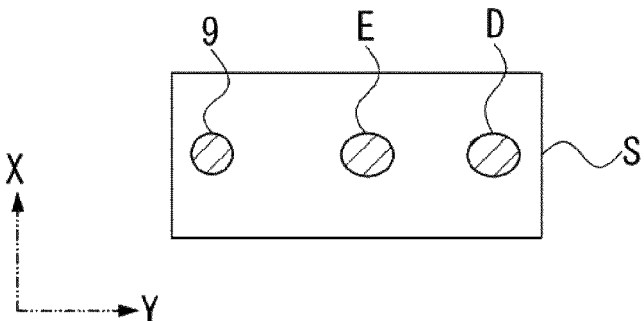
FIGS. 7A and 7B are schematic diagrams illustrating an image example 7A at a first scan and an image example 7B at a second scan when the three-dimensional shape of the foreign object is detected in the first embodiment.
Figure 7B:
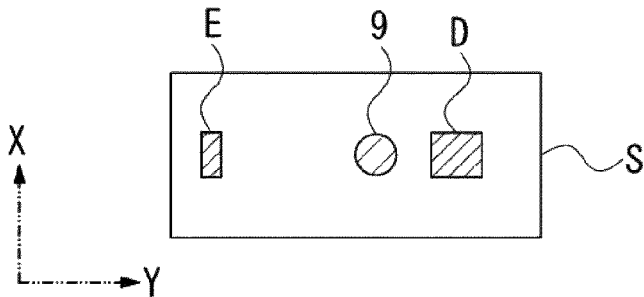

Next, in the X-ray transmission inspection apparatus 1 of this embodiment, as illustrated in FIGS. 6, 7A, and 7B, by integrating information on the sizes and shapes of foreign objects calculated from a plurality of two-dimensional images, the estimation precision of the three-dimensional shapes of the foreign objects D and E is improved.

That is, for example, as illustrated in FIG. 6, in a case in which foreign objects D and E are present in the sample S and the reference piece 9 is installed on the surface (a side of the X-ray sensor) of the sample S, a transmission image detected by an X-ray X1 at a first scan is illustrated in FIG. 7A, and a transmission image detected by an X-ray X2 at a second scan is illustrated in FIG. 7B.

Accordingly, it is possible to obtain information on the sizes and shapes of the foreign objects D and E from a plurality of two-dimensional images (the transmission image at the first scan and the transmission image at the second scan).

Accordingly, in the X-ray transmission inspection apparatus 1 of this embodiment, the X-ray sources 2A and 2B in a plurality of pairs irradiate the sample S with X-rays at different irradiation angles $\theta 1$ and $\theta 2$, and the X-ray sensors 3A and 3B in a plurality of pairs are disposed to detect only transmitted X-rays of X-rays from the corresponding X-ray sources 2A and 2B, and thus a distance between the X-ray sensors 3A and 3B may be set to be large, so transmission images with a large difference between X-ray irradiation angles $\theta 1$ and $\theta 2$ are obtained. Accordingly, between the different transmission images caused by X-ray irradiation performed at different angles, the amount of misalignment of the foreign objects A to E in the sample S increases at the depth position (the height position in the thickness direction) of the foreign objects A to E, so the depth of the position in the foreign object can be estimated with high precision.

In addition, the calculation part 5 calculates the height position of a foreign object by comparison with the height position of the reference piece 9. Accordingly, when the reference of a distance between a transmission image and a foreign object is not determined or when the bending of the sample S is large, the height position of a foreign object may be compared with the reference piece 9 on the surface of the sample S detected, so the depth position (the height position) of the foreign object from the surface of the sample S foreign object may be obtained.

In addition, the X-ray sources 2A and 2B in the plurality of pairs perform the irradiation of X-rays in directions in which the X-rays intersect with each other in the sample S, and thus X-ray irradiation at different irradiation angles $\theta 1$ and $\theta 2$ from the X-ray sources 2A and 2B may be performed on a small region of the sample S. Accordingly, when only a small region is inspected, the distance of the movement of the sample by the sample moving mechanism 4 may be decreased.

Next, a second embodiment of the X-ray transmission inspection apparatus and X-ray transmission inspection method according to the present disclosure will be described with reference to FIG. 8 below. In addition, in the description of the following embodiment, the same components described in the above embodiment are given the same reference numerals, and descriptions thereof are omitted.

Figure 8:
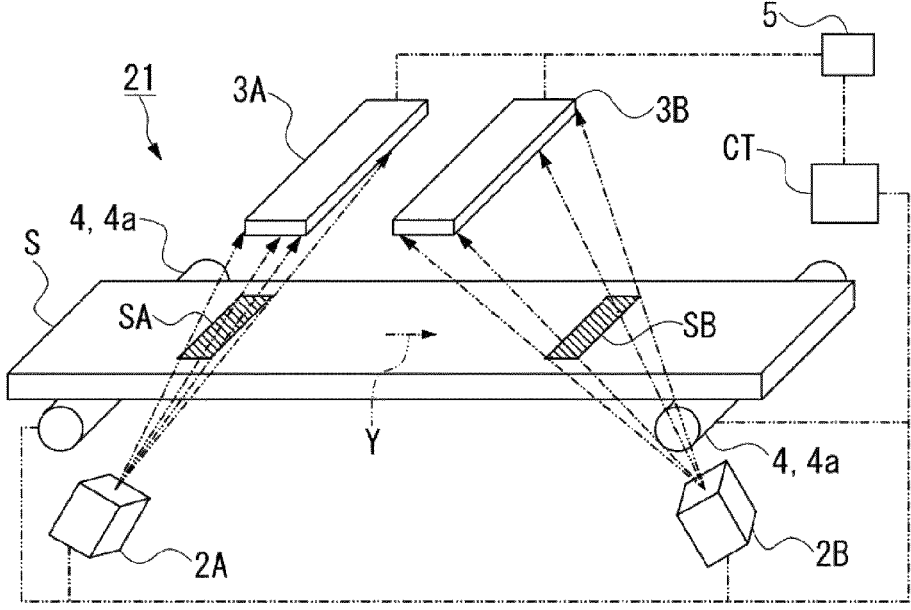
FIG. 8 is a schematic overall configuration view illustrating a second embodiment of the X-ray transmission inspection apparatus and X-ray transmission inspection method according to the present disclosure.

As for a difference between the second embodiment and the first embodiment, in the first embodiment, the X-ray sources 2A and 2B perform the irradiation of X-rays in directions in which the X-rays intersect with each other in the sample S, but in the X-ray transmission inspection apparatus 21 of the second embodiment, as illustrated in FIG. 8, the X-ray sources 2A and 2B are disposed to perform X-ray irradiation to regions SA and SB spaced apart from each other in the transport direction Y.

In addition, as illustrated in FIG. 8, a distance between the X-ray source 2A and the X-ray source 2B is set to be larger in the second embodiment than in the first embodiment.

In the second embodiment, when due to the sample moving mechanism 4, the sample S passes through the region SA in which X-ray irradiation from the X-ray source 2A is performed, a transmission image is detected by the X-ray sensor 3A, and when the sample S additionally moves in the transport direction Y and passes through the region SB in which X-ray irradiation from the X-ray source 2B is performed, a transmission image is detected by the X-ray sensor 3B.

On the basis of the transmission image obtained in the region SA and the transmission image obtained in the region SB, the height position of a foreign object is calculated by the calculation part in the same manner as the first embodiment.

In the second embodiment, like the first embodiment, the X-rays of the X-ray source 2A and the X-ray source 2B are not required to intersect with each other, and the inspection positions of the two pairs (two sets) may be misaligned in the transport direction Y as long as the positions of the inspection width direction X are the same.

Accordingly, in the X-ray transmission inspection apparatus 21 of the second embodiment, since the X-ray sources 2A and 2B perform X-ray irradiation to the regions SA and SB spaced apart from each other in the transport direction Y, the X-ray sources 2A and 2B may be disposed to be spaced by a large distance apart from each other, so without the limitation of the disposition of the X-ray sources, installation freedom thereof may be increased.

In addition, the technical scope of the present disclosure is not limited to the above-described embodiments, and various changes may be made without departing from the spirit of the present disclosure.

What is claimed is:

1. An X-ray transmission inspection apparatus comprising:

a plurality of X-ray sources, each X-ray source of the plurality of X-ray sources configured to irradiate a sample with X-rays;

a plurality of X-ray sensors, each X-ray sensor of the plurality of X-ray sensors installed on a side opposite to the X-ray source relative to the sample and configured to detect transmitted X-rays when X-rays pass through the sample;

a sample moving mechanism configured to move the sample in a transport direction; and a calculation part configured to calculate a height position of a foreign object in a thickness direction in the sample based on the transmitted X-rays detected by the X-ray sensor, wherein a plurality of sets of the plurality of X-ray sources paired with the plurality of X-ray sensors in one-to-one correspondence are provided, each X-ray source of the plurality of sets of the plurality of X-ray sources paired with the plurality of X-ray sensors in one-to-one correspondence irradiates the sample with X-rays at a different irradiation angle with respect to the thickness direction of the sample, and a position in the transport direction at which the foreign object in the sample is first detected by the X-ray sensor of one of the plurality of sets is set as a first passing point; a position in the transport direction at which the foreign object in the sample is detected based on transmitted X-rays detected by the X-ray sensor of the other one of the plurality of sets after the first passing point is detected is set as a second passing point; and the calculation part calculates the height position of the foreign object based on a distance between the first passing point and the second passing point, and the irradiation angles of the sets that detected the foreign object.

2. The X-ray transmission inspection apparatus according to claim 1, wherein an imaging start position of the sample in a predetermined transport direction is set as a reference point; and a distance between the first passing point and the second passing point is calculated based on the reference point.

3. The X-ray transmission inspection apparatus according to claim 1, wherein the X-ray sensor is a TDI sensor.

4. The X-ray transmission inspection apparatus according to claim 2, wherein the X-ray sensor is a TDI sensor.

5. The X-ray transmission inspection apparatus according to claim 1, further comprising:

a reference piece installed on a surface of the sample, wherein the calculation part calculates the height position of the foreign object by comparison with a height position of the reference piece.

6. The X-ray transmission inspection apparatus according to claim 1, wherein each X-ray source of the plurality of sets of the plurality of X-ray sources paired with the plurality of X-ray sensors in one-to-one correspondence perform irradiation with X-rays in directions in which X-rays intersect one another.

7. The X-ray transmission inspection apparatus according to claim 2, wherein each X-ray source of the plurality of sets of the plurality of X-ray sources paired with the plurality of X-ray sensors in one-to-one correspondence perform irradiation with X-rays in directions in which X-rays intersect one another.

8. The X-ray transmission inspection apparatus according to claim 1, wherein each X-ray source of the plurality of sets of the plurality of X-ray sources paired with the plurality of X-ray sensors in one-to-one correspondence irradiates regions spaced apart from one another in the transport direction with X-rays.

9. The X-ray transmission inspection apparatus according to claim 2, wherein each X-ray source of the plurality of sets of the plurality of X-ray sources paired with the plurality of X-ray sensors in one-to-one correspondence irradiates regions spaced apart from one another in the transport direction with X-rays.

10. An X-ray transmission inspection method using the X-ray transmission inspection apparatus according to claim 1, the X-ray transmission inspection apparatus comprising two sets of the plurality of X-ray sources paired with the plurality of X-ray sensors in one-to-one correspondence, the method comprising:

moving the sample in the transport direction;

detecting, as the first passing point, the position in the transport direction at which the foreign object in the sample is detected based on transmitted X-rays detected by the X-ray sensor of one of two sets of the plurality of X-ray sources paired with the plurality of X-ray sensors in one-to-one correspondence;

detecting, as the second passing point, the position in the transport direction at which the foreign object in the sample is detected based on transmitted X-rays detected by the X-ray sensor of the other one of two sets of the plurality of X-ray sources paired with the plurality of X-ray sensors in one-to-one correspondence; and calculating the height position of the foreign object in the sample based on the first passing point, the second passing point, and the irradiation angles of the plurality of X-ray sources of the two sets of the plurality of X-ray sources paired with the plurality of X-ray sensors in one-to-one correspondence.

* * * * *